United States Patent
Rose et al.

(10) Patent No.: US 7,756,700 B2
(45) Date of Patent: Jul. 13, 2010

(54) PERCEPTUAL HARMONIC CEPSTRAL COEFFICIENTS AS THE FRONT-END FOR SPEECH RECOGNITION

(75) Inventors: Kenneth Rose, Ojai, CA (US); Liang Gu, Elmsford, NY (US)

(73) Assignee: The Regents of the University of California, Oakland, CA (US)

(*) Notice: Subject to any disclaimer, the term of this patent is extended or adjusted under 35 U.S.C. 154(b) by 226 days.

(21) Appl. No.: 12/012,334

(22) Filed: Feb. 1, 2008

(65) Prior Publication Data

US 2008/0162122 A1 Jul. 3, 2008

Related U.S. Application Data (63) Continuation of application No. 10/363,523, filed as application No. PCT/US01/30909 on Oct. 2, 2001, now Pat. No. 7,337,107.

(60) Provisional application No. 60/237,285, filed on Oct. 2, 2000.

(51) Int. Cl.
    *G10L 19/02* (2006.01)
(52) U.S. Cl. .................. 704/203; 704/207; 704/208; 704/219; 704/209
(58) Field of Classification Search .......... 704/207, 704/208, 219, 230, 209, 236, 203
    See application file for complete search history.

(56) References Cited

U.S. PATENT DOCUMENTS

| | | | |
|---|---|---|---|
| 3,649,765 A | | 3/1972 | Rabiner |
| 5,596,680 A | * | 1/1997 | Chow et al. ............ 704/248 |
| 5,677,984 A | * | 10/1997 | Mitome ................ 704/220 |
| 5,774,837 A | * | 6/1998 | Yeldener et al. ........ 704/208 |
| 5,826,222 A | * | 10/1998 | Griffin ................. 704/207 |
| RE36,478 E | * | 12/1999 | McAulay et al. ........ 704/206 |
| 6,233,550 B1 | * | 5/2001 | Gersho et al. .......... 704/208 |
| 6,377,916 B1 | * | 4/2002 | Hardwick .............. 704/208 |
| 6,963,833 B1 | * | 11/2005 | Singhal et al. .......... 704/207 |
| 7,337,107 B2 | * | 2/2008 | Rose et al. ............. 704/208 |

OTHER PUBLICATIONS

ISR for parent application PCT/US01/30909.

\* cited by examiner

*Primary Examiner*—Vijay B Chawan
(74) *Attorney, Agent, or Firm*—Berliner & Associates (57) ABSTRACT

Pitch estimation and classification into voiced, unvoiced and transitional speech were performed by a spectro-temporal auto-correlation technique. A peak picking formula was then employed. A weighing function was then applied to the power spectrum. The harmonics weighted power spectrum underwent mel-scaled band-pass filtering, and the log-energy of the filter's output was discrete cosine transformed to produce cepstral coefficients. A within-filter cubic-root amplitude compression was applied to reduce amplitude variation without compromise of the gain invariance properties.

17 Claims, 5 Drawing Sheets

PERCEPTUAL HARMONIC CEPSTRAL COEFFICIENTS AS THE FRONT-END FOR SPEECH RECOGNITION

CROSS REFERENCE TO RELATED APPLICATION

This application is a continuation of U.S. Ser. No. 10/363,523 filed on May 19, 2003 (now U.S. Pat. No. 7,337,107), which claimed the benefit of PCT/US01/30909 which claimed priority of U.S. Provisional Patent Application No. 60/237,285 filed on Oct. 2, 2000, which application is herein incorporated by reference.

STATEMENT REGARDING FEDERALLY SPONSORED RESEARCH OR DEVELOPMENT

This invention was made with Government support under Grant No. IIS-9978001, awarded by the National Science Foundation. The Government has certain rights in this invention.

BACKGROUND OF THE INVENTION

1. Field of the Invention

The field of the invention is both noisy and clean speech recognition.

2. Description of Related Art

While most modern speech recognition systems focus on the speech short-term spectrum for feature analysis-extraction, also referred to as the "front-end" analysis, the technique attempts to capture information on the vocal tract transfer function from the gross spectral shape of the input speech, while eliminating as much as possible the irrelevant effects of excitation signals. However, the accuracy and robustness of the speech representation may deteriorate dramatically due to the spectral distortion caused by the additive background noise. Also, noise robust feature extraction poses a great challenge in the design of high performance automatic speech recognition systems. Over the last several decades, a number of speech spectral representations have been developed, among which the mel-frequency cepstral coefficients (MFCC) have become most popular. [M. J. Hunt, "Spectral signal processing for ASR", *Proc. ASRU'99*, December 1999 and S. B. Davis and P. Mermelstein, "Comparison of parametric representations for monosyllabic word recognition in continuous spoken sentences", *IEEE Trans. Acoust., Speech, Signal Processing*, pp. 357-366, vol. 28, August 1980]. The MFCCs, though adopted by most ASR systems for its superiority in clean speech recognition, do not cope well with noisy speech. The alternative perceptual linear prediction (PLP) coefficients promise improvement over MFCC in noisy conditions by incorporating perceptual features of the human auditory mechanism. Nevertheless, it is believed that the existing front ends are sub-optimal, and the discovery of new noise-immune or noise-insensitive features is needed.

Two problems plague conventional MFCC front-end analysis techniques. The first is concerned with the vocal tract transfer function whose accurate description is crucial to effective speech recognition. However, the irrelevant information of excitation signals must be removed for accurate spectral representation. In the MFCC approach, a smoothed version of the short-term speech spectrum is computed from the output energy of a bank of filters, i.e., the spectrum envelope is computed from energy averaged over each mel-scaled filter. While such a procedure is fast and efficient, it is inaccurate as the vocal tract transfer function information is known to reside in the spectral envelope which is mismatched with the smoothed spectrum, especially for voiced sounds and transitional speech. Alternative approaches based on direct spectral envelope estimation have been reported. [H. K. Kim and H. S. Lee, "Use of spectral autocorrelation in spectral envelope linear prediction for speech recognition", *IEEE Trans. Speech and Audio Processing*, vol. 7, no. 5, pp. 533-541, 1999].

Moreover, the spectrum envelope tends to have much higher signal to noise ratio (SNR) than smoothed spectrum under the same noise conditions, which leads to a more robust representation of the vocal tract transfer function. Hence, speech features derived from the spectral envelope are expected to provide better performance in noisy environments compared with traditional front ends based on smoothed spectrum [Q. Zhu and A. Alwan, "AM-demodulation of speech spectra and its application to noise robust speech recognition", *Proc. ICSLP'2000*, October 2000]. Thus, the MECC approach may not work well for voiced sounds with quasi-periodic features, as the format frequencies tend to be biased toward pitch harmonics, and format bandwidth may be misestimated. Experiments show that this mismatch substantially increases the feature variance within the same utterance.

Another difficulty encountered in conventional accoustic analysis (e.g., MFCC) is that of appropriate spectral amplitude transformation for higher recognition performance. The log power spectrum representation in MFCC is clearly attractive because of its gain-invariance properties and the approximate Gaussian distributions it thus provides. Cubic root representation is used in the PLP representation for psychophysical considerations, at the cost of compromising the level-invariance properties and hence robustness. [H. Hermanslcy, "Perceptual linear predictive (PLP) analysis of speech", *J. Acoust. Soc. America*, pp. 1738-1752, vol. 87, no. 4, April 1990].

Modern speech recognition systems retrieve information on the vocal tract transfer function from the gross spectral shape. The speech signal is generated via modulation by an excitation signal that is quasi-periodic for voiced sounds, and white noise for unvoiced sounds. A typical approach, employed in MFCC and PLP, is to compute the energy output of a bank of band-pass mel-scaled or bark-scaled filters, whose bandwidths are broad enough to remove fine harmonic structures caused by the quasi-periodic excitation of voiced speech. The efficiency and effectiveness of these spectral smoothing approaches led to their popularity. However, there are two drawbacks that significantly deteriorate their accuracy.

Figure 1:
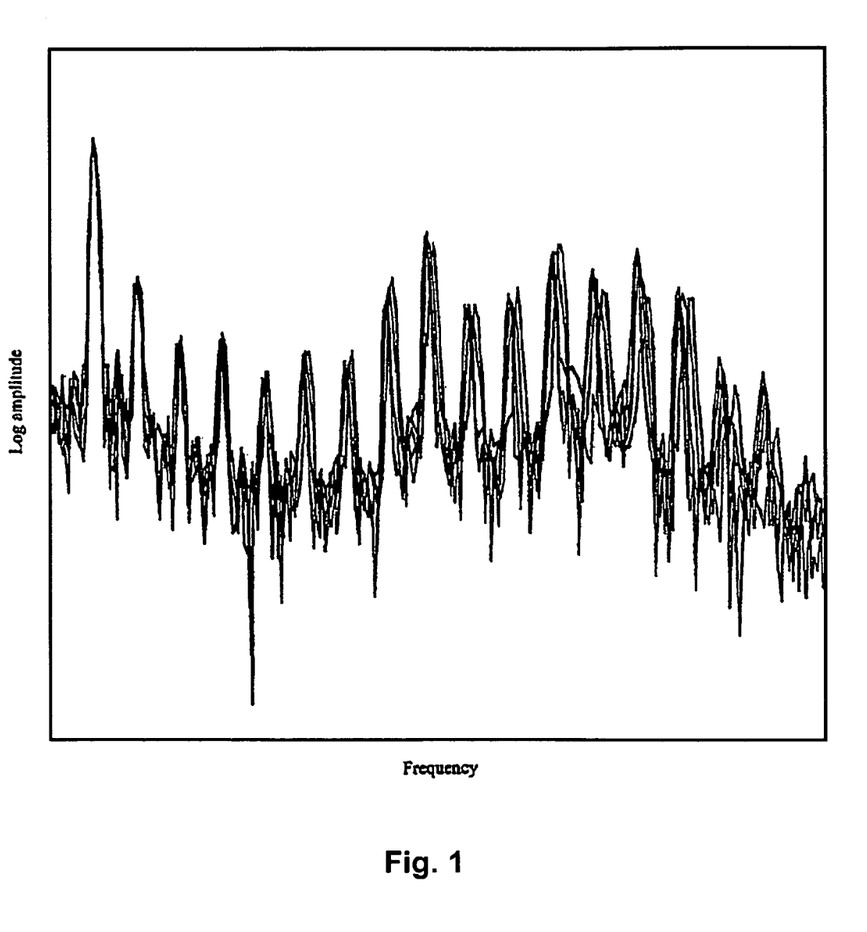
FIG. 1 is a graph illustrating the power spectrum curves (512-point Fast Fourier transform (FFT)) for 5 consecutive frames in speech segment [a]

The first drawback is the limited ability to remove undesired harmonic structures. In order to maintain adequate spectral resolution, the standard filter bandwidth in MFCC and PLP is usually in the range of 200 Hz-300 Hz in the low frequency region. It is hence sufficiently broad for typical male speakers, but not broad enough for high pitch (up to 450 Hz) female speakers. Consequently, the format frequencies are biased towards pitch harmonics and their bandwidth is misestimated The second drawback concerns information extraction to characterize the vocal tract function. It is widely agreed in the speech coding community that it is the spectral envelope and not the gross spectrum that represents the shape of the vocal tract [M. Jelinek, et al., supra]. Although the smoothed spectrum is often similar to the spectral envelope of unvoiced sounds, the situation is quite different in the case of voiced and transitional sounds. Experiments show that this mismatch substantially increases the spectrum variation within the same utterance. This phenomenon is illustrated in FIG. 1 with the stationary part of the voiced sound [a]. FIG. 1 demonstrates that the upper envelope of the power spectrum sampled at pitch harmonics is nearly unchanged, while the variation of the lower envelope is considerable. The conventional smoothed spectrum representation may be roughly viewed as averaging the upper and lower envelopes. It therefore exhibits much more variation than the upper spectrum envelope alone.

The third drawback is the high spectral sensitivity to background noise. The conventional smoothed spectrum representation may be roughly viewed as averaging the upper and lower envelopes. It therefore exhibits much higher SNR than the upper spectrum envelope alone in noisy conditions.

Although some of the loss caused by the imprecision of spectrum smoothing may be compensated for and masked by higher complexity statistical modeling, the recognition rate eventually reaches saturation at high model complexity. The present invention discloses that the sub-optimality of the front-end is currently a major performance bottleneck of powerful, high complexity speech recognizers. Therefore, the present invention discloses the alternative of Harmonic Cepstral Coefficients (HCC), as a more accurate spectral envelope representation.

BRIEF SUMMARY OF THE INVENTION

The present invention overcomes the above shortcomings, and is inspired by ideas from speech coding. [M. Jelinek and J. P. Adoul, "Frequency-domain spectral envelope estimation for low rate coding of speech", *Proc. ICASSP'99*, pp. 253-256, 1999]. Rather than average the energy within each filter, which results in a smoothed spectrum as in MFCC, the harmonic cepstral coefficients (HCC) are derived for voiced speech from the spectrum envelope sampled at harmonic locations for voiced speech. They are similar to MFCC for unvoiced sounds and silence. The extraction of HCCs requires accurate and robust pitch estimation. The present invention uses the spectro-temporal auto-correlation (STA) method for accurate and robust pitch estimation that was previously developed for sinusoidal speech coders. [Y. D. Cho, M. Y. Kim and S. R. Kim, "A spectrally mixed excitation (SMX) vocoder with robust parameter determination", *Proc. ICASSP'98*, pp. 601-604, 1998]. The STA pitch estimation is based on weighted summation of the temporal and spectral auto-correlation values, and efficiently reduces multiple and sub-multiple pitch errors.

The computed (weighted) correlation is further useful for voiced-unvoiced-transitional speech detection. For voiced speech, the harmonic locations are derived from the estimated pitch information, and a peak-picking formula is employed to find the actual harmonic points near the predicted positions. For transitional-speech, a fixed pitch is used within the peak-picking process. The resulting harmonic spectrum is put through mel-scaled band-pass filters and transformed into cepstrum by the discrete cosine transform. The HCC representation is further improved by applying the intensity-loudness power-law within each filter, i.e., applying the cubic-root amplitude compression within each filter, along with logarithmic energy across filters, to reduce the spectral amplitude variation within each filter without degradation of the gain-invariance properties. The resulting features form the "perceptual" HCC (PHCC) representation. Due to the psychophysical intensity-loudness power law, the spectral amplitude variation within each filter is reduced, without degradation of the desired gain-invariance properties, as the filter energy levels are still represented in logarithmic scale. Experiments with the Mandarin digit and the E-set databases show that PHCC significantly outperforms conventional MFCC for both voiced and unvoiced speech.

In another embodiment of the present invention, the PHCC front end is extended for speech recognition in noisy environments by incorporating several "anti-noise" techniques. A weight function is designed for the computation of the harmonic weighted spectrum to mitigate the distortion of harmonic structures caused by background noise. The weight function depends on the prominence of harmonic structure in the frequency domain, instead of the voice/unvoice/transition classification. The power spectrum is lower clipped prior to amplitude or root-power compression to reduce the noise sensitivity associated with small spectral values and to enhance SNR. The root-power function is adjustable to the noisy environment characteristics. Experiments with the Mandarin digit database under varied noisy environments show that PHCC does provide significant improvement over conventional MFCC under noisy conditions.

In yet a further embodiment of the present invention, a new split-band PHCC (SB-PHCC) approach was used to enhance and extend PHCC via split-band spectral analysis. The speech spectrum is split, at a cutoff frequency, into two spectral bands corresponding to harmonic and non-harmonic components. The harmonic weighted spectrum is used in the harmonic band, and traditional smoothed spectrum is adopted for the non-harmonic band. The cutoff frequency selection is optimized by minimizing the average voicing strength ratio of harmonic to non-harmonic bands. Experiments with Mandarin digit and E-set databases show that SB-PHCC significantly outperforms plain PHCC and yields greater gains over conventional MFCC.

These and other features, aspects, and advantages of the present invention will become better understood with regard to the following detailed description, claims and accompanying drawings.

DETAILED DESCRIPTION OF THE INVENTION

Perceptual Harmonic Cepstral Coefficient Computation (PHCC)

PHCC computation is similar to that of MFCC except that it attempts to closely approximate the spectral envelope sampled at pitch harmonics. The procedure was tested in a clean speech environment and comprised the following steps:

1) The speech frame was processed by FFT to obtain the short-term power spectrum;

2) Robust pitch estimation and voiced/unvoiced transition (V/UV/T) classification were performed (the spectrotemporal auto-correlation (STA) was used followed by the peak-picking formula);

3) Class-dependent harmonic weighting was applied to obtain the harmonics weighted spectrum (HWS). For voiced and transitional speech, HWS was dominated by the harmonic spectrum (i.e., upper envelope of the short-term spectrum). For unvoiced sounds, HWS became equivalent to the conventional smoothed spectrum.

4) Mel-scaled filters were applied to the HWS and the log energy output was computed and transformed into cepstrum by the discrete cosine transform (DCT).

Figure 2:
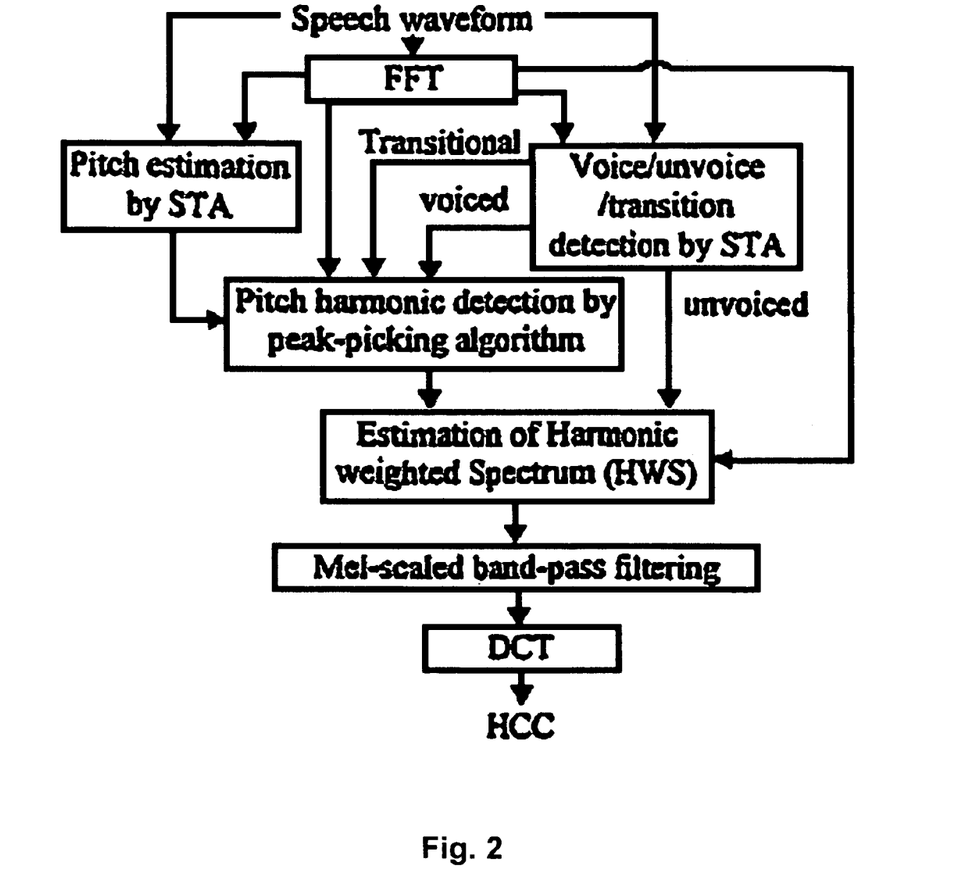
FIG. 2 is a block diagram of HCC analysis.

A block diagram of HCC is shown in FIG. 2. Steps 2) to 4) are herein explained in greater detail.

Robust Pitch Estimation by the Spectro-Temporal Auto-Correlation (STA) Formula

Spectral envelope representation required robust pitch estimation. Minor errors were easily corrected by the peak-picking formula, described herein. However, errors due to pitch multiples or sub-multiples greatly corrupt the HWS computation for voiced speech frames. To mitigate the latter error types, the present invention used the STA formula that was first proposed for the design of harmonic speech coders. [Y. D. Cho, et al., supra].

Temporal auto-correlation (TA) has been traditionally used for pitch estimation. Given a speech signal $s_t(n)$, the TA criterion for candidate pitch $\tau$ is defined as $$R^T(\tau) = \frac{\sum_{n=0}^{N-\tau-1} [\tilde{s}_t(n) \cdot \tilde{s}_t(n+\tau)]}{\sqrt{\sum_{n=0}^{N-\tau-1} \tilde{s}_t^2(n) \cdot \sum_{n=0}^{N-\tau-1} \tilde{s}_t^2(n+\tau)}}$$

where $\tilde{s}_t(n)$ is the zero-mean version of $s_t(n)$, and N is the number of samples for pitch estimation. The pitch estimate was obtained by maximizing TA. Unfortunately, TA occasionally selects pitch multiples, especially when the speech signal is highly periodic with a short pitch period. This error is disastrous for the purposes of the present invention as it corrupts the estimated harmonic spectral envelope. Spectral auto-correlation (SA) was proposed to circumvent the pitfall of pitch multiples, and is defined as:

$$R^S(\tau) = \frac{\int_0^{\pi-\omega_\tau} \tilde{S}_f(\omega) \tilde{S}_f(\omega+\omega_\tau)}{\sqrt{\int_0^{\pi-\omega_\tau} \tilde{S}_f^2(\omega) \int_0^{\pi-\omega_\tau} \tilde{S}_f^2(\omega+\omega_\tau)}}$$

where $\omega_\tau = 2\pi/\tau$, $s_f(\omega)$ is the magnitude spectrum of $s_t(n)$, and $\tilde{S}_f(\omega)$ is the zero-mean version of $S_f(\omega)$.

Clearly, the danger here is of pitch sub-multiples. To mitigate both error types, STA was defined as an average criterion:

$$R(\tau) = \beta \cdot R^T(\tau) + (1-\beta) \cdot R^s(\tau)$$

where $\beta=0.5$ was found to yield good results in practice. [Y. D. Cho, et al., supra].

The STA criterion $R(\tau)$ was also used to perform V/UV/T detection. If $R(\tau) > \alpha_V$, the speech frame is classified as voiced, if $R(\tau) < \alpha_U$, it is classified as unvoiced, and if $\alpha_V > R(\tau) \geq \alpha_U$, it is declared transitional. The two thresholds can be determined based on experiments. While the thresholds were $\alpha_V = 0.8$ and $\alpha_U = 0.5$ in the present invention, the optimal value of these thresholds can vary between about $1 \geq \alpha_V \cong 0.5$ and $0.5 \geq \alpha_U \geq 0.3$, respectively, for different recognition tasks and noise environments.

The Teak-Picking Formula

In the case of voiced speech frames, a more accurate determination of the harmonic frequencies was obtained by applying the peak-picking formula to the power spectrum, which corrected minor pitch estimation errors or non-integer pitch effects. The initial estimated harmonics obtained from STA were refined by looking for local maxima in a search interval that excluded neighboring harmonics. Once the peaks were found, the power spectrum value at pitch harmonics was given emphasis by appropriate weighting, as discussed next.

The peak-picking formula was also useful for transitional speech frames, as they contain some quasi-harmonic structures. Since there are no well-defined initial harmonic frequencies, they were set to fixed values (multiples of 100 Hz were quite effective in the examples).

Harmonics Weighted Spectrum (HWS)

Spectral envelope representation as above has been previously proposed and is currently used in harmonic speech coding, where the spectrum amplitude sampled at pitch harmonics is vector quantized. However, the number of harmonics varies significantly from speaker to speaker (a problem that led to growing interest in variable dimension vector quantization). This also implies that some processing must be applied to the harmonic spectrum prior to its applicability to speech recognition. We propose to use the harmonics weighted energy output of mel-scale filters instead of the harmonic spectrum directly.

In the case of voiced speech, the most important information available about the spectral envelope is captured by the spectrum sampled at pitch harmonic frequencies. If the spectrum between pitch harmonics is smooth, interpolation methods can be used to retrieve the spectrum spline, albeit with high sensitivity to pitch estimation errors. Instead, the present invention disclosed a different approach called harmonics weighted spectrum (HWS) estimation. Given $S_f(\omega)$, the magnitude spectrum of input speech, HWS is defined as:

$$HWS(\omega) = w_h(\omega) \cdot S_f(\omega)$$

$$\text{where } w_h(\omega) = \begin{cases} W_H, & \omega \text{ is pitch harmonic} \\ 1, & \text{otherwise} \end{cases}$$

As shown in FIG. 2, the filter log-energy is calculated from the HWS and followed by DCT to generate the cepstral coefficients.

In our simulations, $W_H$ was set to 100 for voiced sounds and 10 for transitional sounds. The HWS of voiced speech reflected the spectrum spline at harmonic points. In the case of unvoiced speech, HWS was simply the power spectrum. The HWS of transitional speech represented the power spectrum with emphasis on quasi-harmonic points. Therefore, when combined with mel-scaled band-pass filtering, HWS was effectively used to extract parameters that characterize the spectral envelope for the three classes of speech frames.

Perceptual Harmonic Cepstral Coefficients

A. Within-Filter Amplitude Compression

It is widely recognized that auditory properties can be exploited to improve automatic speech recognition. Perhaps the most notable example is the common use of band-pass filters of broader bandwidth at high frequencies, according to the frequency resolution of the human ear. MFCC implements this by mel-scaled spacing, and PLP employs critical-band spectral resolution. Another important aspect, the perceptual transformation of the spectrum amplitude, is handled in radically different ways by the leading front-end systems.

PLP applies the equal-loudness curve and the intensity-loudness power law to better exploit knowledge about the auditory system, but requires scale normalization, which was experimentally found critical for the overall recognition performance. MFCC sacrifices some perceptual precision and circumvents this difficulty by approximating the auditory curve with a logarithmic function that offers the elegant level-invariance properties.

In an attempt to enjoy the best of both worlds, the present invention applied a novel approach, the use of intensity-loudness power-low (e.g., use of cubic-root amplitude compression) within each filter and computed the log energy over all filters. Hence, $$\hat{S}(\omega)=[S(\omega)]^{1/3}$$

$$\hat{E}_1=\log(E_1), 1 \geq i \geq M$$

where $\hat{S}(\omega)$ is the compressed spectrum and $\hat{E}_1$ is the log energy for band-pass filter i. The resulting spectrum representation significantly reduced the amplitude variation within each filter, without degradation of the gain-invariance properties and, since the filter energy levels were still represented in logarithmic scale, without recourse to normalization.

B. Perceptual Harmonic Cepstrum Coefficients

Figure 3:
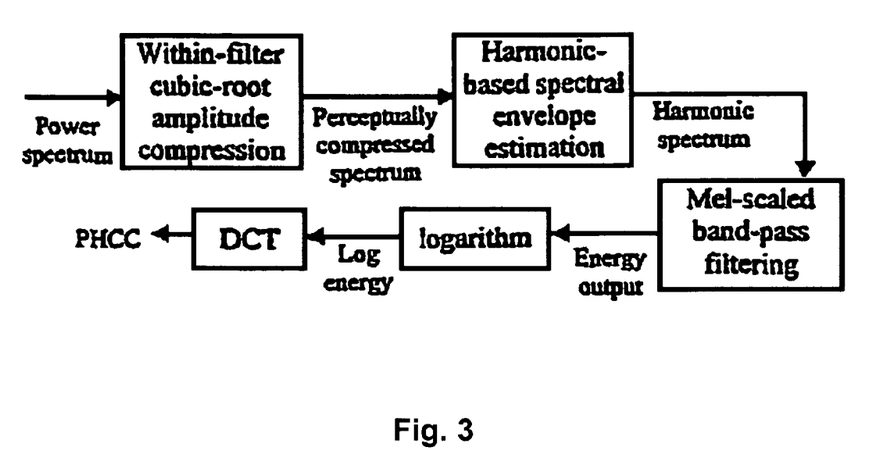
FIG. 3 is a schematic representing PHCC speech analysis.

The above perceptual amplitude transformation was incorporated within the HCC framework to obtain the proposed perceptual HCC (PHCC), as is shown in FIG. 3. Note: the within-filter amplitude compression reduced envelope corruption damage caused by pitch harmonic errors in the case of voiced sounds, and decreased amplitude variation due to white-noise in unvoiced sounds. It thus improved the accuracy and robustness of spectral envelope estimation.

EXAMPLE 1

To test the performance of PHCC, experiments were first carried out on a database of speaker-independent isolated Mandarin digits collected in an office environment The recognition task consists of 11 pronunciations representing 10 Mandarin digits from 0 to 9, with 2 different pronunciations for the digit "1" ([i] and [iao]). The database includes 150 speakers (75 male and 75 female), one utterance per speaker. Of the 150 speakers, 60 male and 60 female speakers were selected at random for training, and the remaining 30 speakers were set aside for the test set.

In our examples, 26-dimension speech features were used, including 12 cepstral (NTCC or PHCC) parameters, log energy, and their dynamics (time derivatives). We used an analysis frame of width 30 ms and step of 10 ms, and a Hamming window. 9-state tied-mixture HMM was used with 99 single Gaussian pdfs. The experiment results for PHCC and MFCC are summarized in Table 1.

TABLE 1

Test-set error rate based on PHCC and MFCC for speaker-independent isolated Mandarin digit recognition

|  | Male | Female | Male & Female |
|---|---|---|---|
| MFCC | 0.5% | 3.0% | 2.1% |
| PHCC | 0.2% | 1.4% | 1.1% |

TABLE 2

Test-set error rate based on PHCC and MFCC for English E-set recognition

| Acoustic Models | 7-state CHMM | 13-state CHMM | 21-state TMHMM |
|---|---|---|---|
| MFCC | 15.3% | 11.0% | 7.3% |
| PHCC | 12.2% | 9.0% | 6.2% |

Table 1 shows that the error rate has been decreased by about 50% for both male and female speakers, and demonstrates the consistent superiority of PHCC over speakers with differing pitch levels. The main source of errors in recognizing Mandarin digits is the confusion between vowels such as [a] and [e]. This is where the spectral envelope based PHCC substantially outperforms conventional MFCC, hence the significant gains observed.

To critically test the performance of PHCC on unvoiced sounds, experiments were further carried out on OGI's E-set database. The recognition task is to distinguish between nine confusable English letters {b, c, d, e, g, p, t, v, z}, where the vowels are of minimal significance to the classification task. The database was generated by 150 speakers (75 male and 75 female) and includes one utterance per speaker. The results are summarized in Table 2.

PHCC achieved better results than MFCC over a range of acoustic model complexities, and offers over 15% error reduction relative to MFCC. As the utterances in the E-set database mainly differ in the unvoiced sounds, the improvement is contributed to the new perceptual amplitude transformation and the handling of transition sounds in the harmonic spectrum estimation.

EXAMPLE 1 RESULTS

The proposed harmonic cepstral coefficients (HCC) offer a representation of the spectral envelope based on the harmonic spectrum, which is a weighted version of the power spectrum that emphasizes pitch harmonics. The weighting function depends on the frame's V/UV/T classification. In order to exploit both the psychophysical and gain-invariance properties of PLP and MFCC, respectively, the method employs within-filter cubic root amplitude compression and logarithmic level-scaled band-pass filtering. Experiments on the Mandarin digit and E-set databases show substantial performance gains of PHCC over MFCC. Future work will focus on the extension of PHCC to perceptual harmonic linear prediction.

We tested PHCC both on the OGI E-set database and the speaker-independent isolated Mandarin digit database to compare with standard MFCC. On E-set, with 7-state continuous HMMs, the test set recognition rate increased from about 84.7% (MFCC) to 87.8% (PHCC), i.e. 20% error rate reduction. With 21-state tied-mixture HMMs (TMHMM), the accuracy improved from about 92.7% to 93.8%, i.e., 15% error rate reduction. For the Mandarin digit database, the error rate based on 9-state TMMMs is decreased from about 2.1% to 1.1%, which translates into a considerable 48% error rate reduction.

PHCC Computation in Noisy Speech Environments

PHCC was also extended to noisy speech recognition. To achieve this goal, several anti-noise modifications were applied to our previously proposed PHCC method. The procedure comprised the following steps:

1) The speech frame is processed by DFT to obtain the short-term power spectrum;

2) The intensity-loudness power law is applied to the original spectrum to obtain the root-power compressed spectrum;

3) Robust pitch estimation and voiced/unvoiced/transition (V/UV/T) classification are performed (We employ the spectro-temporal auto-correlation (STA) followed by the peak-picking formula);

4) Class-dependent harmonic weighting is applied to obtain the harmonics weighted spectrum (HWS). For voiced and transitional speech, HWS is dominated by the harmonic spectrum (i.e. upper envelope of the short-term spectrum). For unvoiced sounds, HWS degenerates to the conventional smoothed spectrum.

5) Mel-scaled filters are applied to the HWS and the log energy output is computed and transformed into cepstrum by the discrete cosine transform (DCT).

Figure 4:
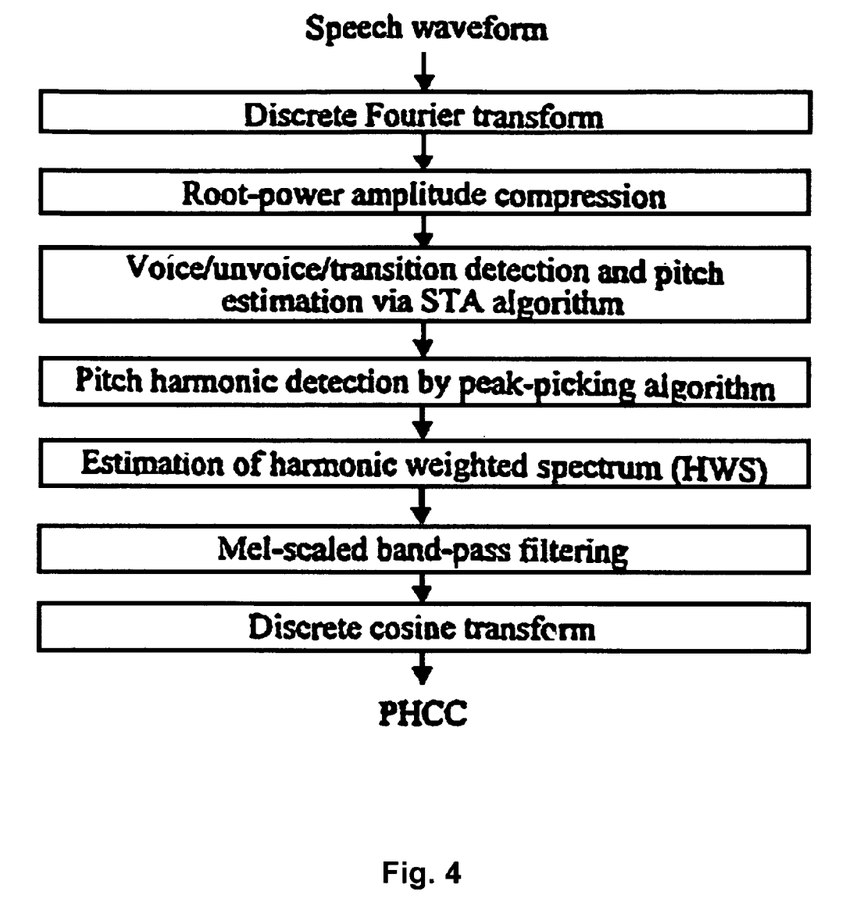
FIG. 4 is a flowchart of PHCC analysis followed in noisy speech recognition.

A flowchart of PHCC computation is shown in FIG. 4. Steps 3 and 4 are explained in greater detail herein.

Modified Weight Function for the HWS

The advantages of spectral envelope representation over conventional smoothed spectrum representation are less obvious in noisy environments. On the one hand, the harmonic spectrum estimation discards the variations in the valleys between harmonic locations caused by the background noise, which leads to more robust spectral representation. On the other hand, the original harmonic structure in voiced and transitional speech may be blurred significantly by the input additive noise, especially in high frequency regions. A solution to these problems calls for a more effective weight function for the HWS.

Here we propose a modified weight function for HWS estimation in noisy environments. A new parameter, harmonic confidence, is defined as $$H_a = \max_\tau R(\tau),$$

where $R(\tau)$ is the spectro-temporal autocorrelation criterion.

The harmonic weight of (1) is now modified to $$w_h(\omega) = \begin{cases} \max(1, e^{(H_a-\eta)\cdot\gamma}), & \text{if } \omega \leq \omega_T \text{ is pitchharmonic} \\ 1, & \text{otherwise} \end{cases},$$

where $\omega_T$ is the cut-off frequency. In the modified HWS computation, the harmonic-based spectral envelope is emphasized in the low frequency zone below $\omega_T$, whose harmonic structure is more robust to additive noise. The conventional smoothed spectrum is retained in the high frequency zone above $\omega_T$. In addition, the weight value depends on the harmonic confidence $H_a$, to account for the effect of noise signals, where $\eta$ is the harmonic confidence threshold, and $\gamma$ is the weight factor. In our experiment, $\omega_T$, $\eta$ and $\gamma$ are set to 2.5 kHz, 0.5 and 10, respectively.

Pre-Compression Spectral Masking

One major shortcoming of logarithm-based approaches (including MFCC and PLP) is that the logarithm function is unbounded as its argument tends to zero. It is thus very sensitive to small input values. This may greatly deteriorate the representation robustness, as these low energy parts hold the worst SNR under noisy environments. A common noise reduction technique is to apply a lower bound to the original spectrum (D. H. Klatt, "A digital filter bank for spectral matching", Proc. ICASSP'79, pp. 573-576, 1979) before the logarithm operation. We found that this technique may be beneficially applied to the within-filter amplitude compression.

If $S(\omega)$ is the original spectrum, the masking operation can be defined as $$\tilde{S}(\omega) = \max(S(\omega), c),$$

where c is a very small value, which may either be a fixed number or vary depending on noise conditions.

Root-Power Representation

Another modification to improve the performance of PHCC representation in noisy environments consists of replacing the intensity-loudness power-low with $$\hat{S}(\omega) = [\tilde{S}(\omega)]^\theta$$

where $\theta$ is the root-power factor. While it was previously set to a fix value in clean speech recognition, it may now be adjusted to the noise environment

EXAMPLE 2

To test the performance of PHCC, experiments were first carried out on a database of speaker-independent isolated Mandarin digits collected in white and babble noise environment. The recognition task consists of 11 pronunciations representing 10 Mandarin digits from 0 to 9, with 2 different pronunciations for the digit "1" ([i] and [iao]). The database includes 150 speakers (75 male and 75 female) with one utterance per speaker. Of the 150 speakers, 60 male and 60 female speakers were selected at random for training, and the remaining 30 speakers were set aside for the test set.

In our experiment, 26-dimension speech features were used, including 12 cepstral (MFCC or PHCC) parameters, log energy, and their dynamics (time derivatives). We used an analysis frame of width 30 ms and step of 10 ms, and a Hamming window. 9-state continuous-density HMM was used with single Gaussian pdf per state. The experiment results for PHCC and MFCC are summarized in Table 3 and 4.

TABLE 3

Test-set error rates of PHCC and MFCC for speaker-independent isolated Mandarin digit recognition under white noise environment

| Front-end | Clean | 20 dB | 10 dB | 0 dB |
|---|---|---|---|---|
| MFCC | 2.1% | 4.8% | 16.9% | 45.6 |
| PHCC | 1.1% | 2.9% | 13.0% | 29.1 |

TABLE 4

Test-set error rates of PHCC and MFCC for speaker-independent isolated Mandarin digit recognition under babble noise environment

| Front-end | Clean | 20 dB | 10 dB | 0 dB |
|---|---|---|---|---|
| MFCC | 2.1% | 4.1% | 13.3% | 35.2% |
| PHCC | 1.1% | 2.3% | 10.5% | 27.4% |

Table 3 shows that the error rate decreased by nearly 50% in clean speech environment and by 23% to 36% in white noise environment, and demonstrates consistent superiority of PHCC over MFCC at differing noise levels. Table 4 shows that similar improvement of PHCC is achieved in babble noise environment. The main source of errors in recognizing Mandarin digits is the confusion between vowels such as [a]

and [e]. This is where the spectral envelope based PHCC substantially outperforms conventional WCC, hence the significant and consistent gains observed in clean speech and noisy environments. The improvement in noisy environment is also attributed to modified weight function for HWS, and the within-filter root-power amplitude compression following low-bound masking procedure.

Split-Band PHCC

The advantage of PHCC over conventional acoustic analysis methods is mainly attributed to its spectral envelope estimation It is widely recognized in the speech coding community that it is the spectral envelope and not the gross spectrum that represents the shape of the vocal tract However, spectral envelope estimation may greatly reduce the representation accuracy and robustness in the case of non-harmonic sounds. In our early PHCC approach, the possible distortion due to spectral envelope extraction was mitigated by effective V/UV/T detection. Nevertheless, significant distortion was observed in voiced and transitional speech since the spectral envelope was estimated by HWS throughout the frequency domain. While HWS performs well in the harmonic region of the speech spectrum, it tends to impart an undesirable effect to noise-like non-harmonic regions and hence reduce robustness. To overcome this drawback, we propose the split-band PHCC (SB-PHCC), in which spectral envelope extraction is restricted to the harmonic band where the harmonic structure is rich and reliable, while conventional smoothed spectral estimation is applied to the non-harmonic band for higher representation robustness and accuracy.

Figure 5:
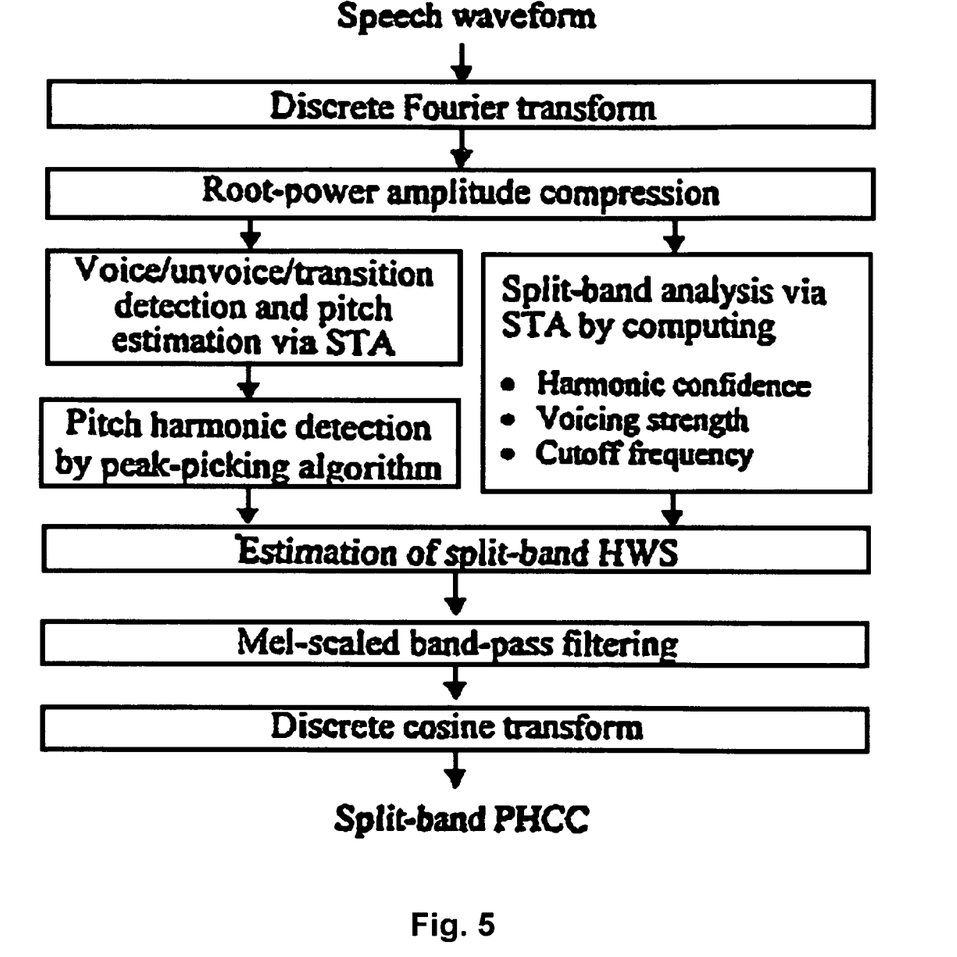
FIG. 5 is a flowchart of split-band PHCC (SB-PHCC) analysis.

A flowchart of the SB-PHCC formula is shown in FIG. 5. The speech signal undergoes discrete Fourier transformation, followed by root-power compression, as in plain PHCC. However, in SB-PHCC the STA formula is not only adopted for robust V/UV/T detection and pitch estimation, but also for split-band analysis by computing three new parameters, namely, harmonic confidence, voicing strength and cutoff frequency, which reflect the prominence of harmonic structures in the speech spectrum. These parameters, as well as the peak-picked harmonic locations, form the basis of split-band HWS estimation The extracted mixed spectrum passes through mel-scaled band-pass filters, followed by discrete cosine transform, and results in the split-band perceptual harmonic cepstral coefficients.

Spectro-Temporal Autocorrelation (STA)

Robust pitch estimation is critical for harmonic-based spectral envelope representation Although small errors could be corrected by a peak-picking formula as described in, pitch multiple and sub-multiple errors can greatly reduce the accuracy of the spectral envelope for voiced sounds. One effective approach to eliminate such errors is the STA formula, which was first proposed for design of harmonic speech coders. In this paper, STA is further harnessed to measure the harmonic characteristics of the speech spectrum, via the computation of three new parameters described herein.

Given a speech signal $s_t(n)$, the temporal auto-correlation (TA) for candidate pitch $\tau$ is defined as $$R^T(\tau) = \frac{\sum_{n=0}^{N-\tau-1} [\tilde{s}_t(n) \cdot \tilde{s}_1(n+\tau)]}{\sqrt{\sum_{n=0}^{N-\tau-1} \tilde{s}_t^2(n) \cdot \sum_{n=0}^{N-\tau-1} \tilde{s}_t^2(n+\tau)}}$$

where $\tilde{s}_t(n)$ is the zero-mean version of $s_t(n)$, and N is the number of samples for pitch estimation.

Motivated by the pitch multiple errors that were observed in the conventional TA method, the spectral auto-correlation (SA) criterion was introduced and defined as $$R^S(\tau) = \frac{\int_0^{\pi-\omega_\tau} \tilde{S}_f(\omega) \tilde{S}_f(\omega + \omega_\tau)}{\sqrt{\int_0^{\pi-\omega_\tau} \tilde{S}_f^2(\omega) \int_0^{\pi-\omega_\tau} \tilde{S}_f^2(\omega + \omega_\tau)}}$$

where $\omega_\tau = 2\pi/\tau$, $S_f(\omega)$ is the power spectrum of $s_t(n)$, and $\tilde{S}_f(\omega)$ is the zero-mean version of $S_f(\omega)$. However, pitch sub-multiple may occur in SA. STA was devised to reduce both pitch multiple and sub-multiple errors, and is defined as:

$$R(\tau) = \beta \cdot R^T(\tau) + (1-\beta) \cdot R^S(\tau) \tag{1}$$

where $\beta = 0.5$ was reported to yield the best results in.

Harmonic Weighted Spectrum (HWS)

Spectral envelope representation is currently widely used in harmonic speech coding, and more recently in speech recognition. If the speech spectrum between pitch harmonics is smooth, interpolation or normalization methods can be used to retrieve the spectrum spline, albeit with high sensitivity to pitch estimation errors. Instead, we proposed an approach called harmonic weighted spectrum (HWS) estimation. Given $S_f(\omega)$, the magnitude spectrum of input speech, HWS is defined as $$HWS(\omega) = w_h(\omega) \cdot S_f(\omega)$$

where $w_h(\omega)$ is the harmonic weighting function which was originally defined in as $$w_h(\omega) = \begin{cases} W_H, & \omega \text{ is pitch harmonic} \\ 1, & \text{otherwise} \end{cases} \tag{2}$$

where $W_H$ was adjusted depending on the V/UV/T classification. It was set to a high value for voiced sounds and intermediate value for transitional sounds. The harmonic weighting function is modified in this paper, as will be explained next.

Split-Band Analysis

The PHCC harmonic weighting function $w_h(\omega)$ does not take into account the distortion of spectral envelope estimation at non-harmonic locations for both voiced and transitional speech. A split-band analysis is hence proposed here to eliminate this drawback. The underlying premise of this technique is that there exists a single transition frequency (the voicing cutoff frequency) below which the harmonic structure is rich and clear, and above which the spectrum is essentially non-harmonic. Therefore, for voiced and transitional sounds, the original spectrum is split into two bands—the (low frequency) harmonic band and the (high frequency) non-harmonic band. Given the differing characteristics of the two bands, potential gains are expected if they are treated separately. In the proposed SB-PHCC, HWS is implemented in the harmonic band, while MFCC is used in the non-harmonic band. Thus, the accuracy of the spectral envelope representation is maintained by harmonic-weighted spectral estimation, while the noise-sensitivity in the non-harmonic band is reduced by the smoothing procedure, where no harmonic-based analysis is necessary.

To carry out the split-band analysis, three new parameters are defined and computed to measure the prominence of the harmonic structures observed in the speech spectrum.

The prominence of the harmonic structure over the full-band may be measured by the harmonic confidence, which is defined as $$H_a = \max_\tau R(\tau),$$

where $R(\tau)$ is the STA defined above.

The prominence of the harmonic structure about frequency i can be measured by the voicing strength, which is defined as $$V_S(\Omega) = \frac{\int_{\Omega-\omega_0}^{\Omega} \tilde{S}_f(\omega)\tilde{S}_f(\omega+\omega_0)d\omega}{\sqrt{[\int_{\Omega-\omega_0}^{\Omega} \tilde{S}_f^2(\omega)d\omega][\int_{\Omega}^{\Omega+\omega_0} \tilde{S}_f^2(\omega)d\omega]}}$$

where $\omega_0$ is the fundamental frequency.

The boundary between harmonic band and non-harmonic band is specified by a voicing cutoff frequency. The voicing cutoff frequency is recognized as an important quantity in speech coding, where a number of relevant techniques have been developed [D. W. Griffin and J. S. Lim, "Multiband Excitation Coder", *IEEE Trans. ASSP*, vol. 36, pp. 1223-1235, 1988 and E. K Kim and Y. H. Oh, "New analysis method for harmonic plus noise model based on time-domain]. Here we propose an formula based on average voicing strength ratio between the harmonic band and non-harmonic band, which can be described as $$\omega_T = \arg \max_{\omega_{T_l} < \omega < \omega_{T_h}} \frac{\left[\int_{\omega_{T_l}}^{\omega} V_s(\Omega)d\Omega\right] / (\omega - \omega_{T_l})}{[\int_{\omega}^{\omega_{T_h}} V_s(\Omega)d\Omega] / (\omega_{T_h} - \omega)} \quad (3)$$

where $\omega_{T_l}$ and $\omega_{T_h}$ delimit the allowed interval for the cutoff frequency. In our experiment, we set $\omega_{T_l}=200\pi$ and $\omega_{T_h}=600\pi$.

We hence propose a new harmonic weighting function, which is substantially different from the one we used in plain PHCC The SB-PHCC harmonic weighing function is defined as $$w_h(\omega) = \begin{cases} \max(1, e^{(H_a-\eta)\cdot\gamma}), & \text{if } \omega \le \omega_T \text{ is pitch harmonic} \\ 1, & \text{otherwise} \end{cases},$$

where $\eta$ is the harmonic confidence threshold, $\gamma$ is the weight factor, and $\omega_T$ is the cut-off frequency. For voiced sounds, $\omega_T$ is obtained from (3). For transitional sounds, $\omega_T$ is fixed due to the reduced reliability of (3) which is compromised by low average voicing strength in the harmonic band. In our experiments, $\eta$ and $\gamma$ are set to 0.5 and 10, respectively, and $\omega_T$ is set to $4000\pi$ for transitional sounds.

Within-Filter Amplitude Compression

The perceptual amplitude compression procedure we developed for plain PHCC is applied in SB-PHCC to reduce amplitude variation, and is summarized here for completeness.

It is widely recognized that auditory properties can be exploited to improve automatic speech recognition. One example is the perceptual transformation of the spectrum amplitude, which is handled in radically different ways by the leading acoustic analysis systems. PLP applies the equal-loudness curve and the intensity-loudness power law to better exploit knowledge about the auditory system, but requires scale normalization, which was experimentally found to have a critical impact on the overall recognition performance. MFCC sacrifices some perceptual precision and circumvents this difficulty by approximating the auditory curve with a logarithmic function that offers the elegant level-invariance properties.

In an effect to enjoy the best of both approaches, we apply the intensity-loudness power-low within each filter and compute the log energy over all filters. Hence, $$\hat{S}(\omega)=[S(\omega)]^\theta$$

$$\hat{E}_1=\log(E_1), 1 \le i \le M$$

where $\hat{S}(\omega)$ is the compressed spectrum, $\hat{E}_1$ is the log energy for band-pass filter i, and $\theta$ is the root-power factor. The resulting spectrum representation can significantly reduce the amplitude variation within each filter, without degradation of the gain-invariance properties and, since the filter energy levels are still represented in logarithmic scale, without recourse to normalization.

The cubic-root amplitude compression ($\theta=\frac{1}{3}$) selected in was found to perform best in our clean speech experiment. It was, however, not optimal in our noise speech experiment Instead, we vary $\theta$ with SNR to achieve improve performance ($\theta$ is set to $\frac{2}{3}$ for very low SNR).

EXAMPLE 3 RESULTS

To test the performance of SB-PHCC, experiments were first carried out on a database of speaker-independent isolated Mandarin digits collected in an office environment. The recognition task consists of 11 pronunciations representing 10 Mandarin digits from 0 to 9, with 2 different pronunciations for the digit "1" ([i] and [iao]). The database includes 150 speakers (75 male and 75 female), one utterance per speaker. Of the 150 speakers, 60 male and 60 female speakers were selected at random for training, and the remaining 30 speakers were set aside for the test set In our experiments, 39-dimension speech features were used, including 12 cepstral parameters, log energy, and their first-order and second-order dynamics (time derivatives). We used an analysis frame of width 30 ms and step of 10 ms, and Hamming window. 9-state continuous density HMM was used with single Gaussian pdf per state. The experimental results for MFCC, PHCC and SB-PHCC are summarized in Table 5. It shows substantial decrease in error rate from MFCC, through PHCC, to SB-PHCC, for both male and female speakers.

To further test the performance of SB-PHCC on unvoiced sounds, additional experiments were carried out on OGI's E-set database. The recognition task is to distinguish between nine highly confusable English letters {b, c, d, e, g, p, t, v, z}, where the vowels are of minimal significance to the classification task. The database was generated by 150 speakers (75 male and 75 female) and includes one utterance per speaker. The experimental results are summarized in Table 6. SB-PHCC achieved consistently better results than PHCC over a range of acoustic model complexities, and offers over 15% error reduction relative to MFCC.

TABLE 5

Test-set error rate of MFCC, PHCC and SB-PHCC
on isolated Mandarin digit recognition

| Speaker Gender | Male | Female | Male & Female |
|---|---|---|---|
| MFCC | 0.6% | 3.9% | 2.9% |
| PHCC | 0.4% | 2.4% | 1.8% |
| SB-PHCC | 0.3% | 1.9% | 1.4% |

TABLE 6

Test-set error rate of MFCC, PHCC and SB-PHCC on the E-set

| Acoustic Models | 7-state CHMM | 13-state CHMM | 21-state TMHMM |
|---|---|---|---|
| MFCC | 15.3% | 11.0% | 7.3% |
| PHCC | 12.2% | 9.0% | 6.2% |
| SB-PHCC | 11.3% | 8.5% | 5.8% |

The following references are incorporated herein by reference: M. J. Hunt, "Spectral signal processing for ASR", *Proc. ASRU'99*, December 1999; S. B. Davis and P. Mermelstein, "Comparison of parametric representations for monosyllabic word recognition in continuous spoken sentences", *IEEE Trans. Acoust., Speech, Signal Processing*, pp. 357-366, vol. 28, August 1980; H. Hermansky, "Perceptual linear predictive (PLP) analysis of speech", *J. Acoust. Soc. America*, pp. 1738-1752, vol. 87, no. 4, April 1990; M. Jelinek and J. P. Adoul, "Frequency-domain spectral envelope estimation for low rate coding of speech", *Proc. ICASSP'99*, pp. 253-256, 1999; Y. D. Cho, M. Y. Kim and S. R. Kim, "A spectrally mixed excitation (SMX) vocoder with robust parameter determination", *Proc. ICASSP'98*, pp. 601-604, 1998; Q. Zhu and A. Alwan, "AM-demodulation of speech spectra and its application to noise robust speech recognition", *Proc. ICSLP'2000*, October 2000; L. Gu and K Rose, "Perceptual harmonic cepstral coefficients as the front-end for speech recognition", *Proc. ICSLP'2000*, October 2000; D. H. Klatt, "A digital filter bank for spectral matching", *Proc. ICASSP'79*, pp. 573-576, 1979; H. K. Kim and H. S. Lee, "Use of spectral autocorrelation in spectral envelope linear prediction for speech recognition", *IEEE Trans. Speech and Audio Processing*, vol. 7, no. 5, pp. 533-541, 1999; L. Gu and K Rose, "Perceptual harmonic cepstral coefficients for speech recognition in noisy environment", *Proc. ICASSP'2001*, May 2001; D. W. Griffin and J. S. Lim, "Multi-band Excitation Coder", *IEEE Trans. ASSP*, vol. 36, pp. 1223-1235, 1988; and E. K. Kim and Y. H. Oh, "New analysis method for harmonic plus noise model based on time-domain periodicity score", *Proc. ICSLP*, 2000.

Although the foregoing invention has been described in some detail by way of illustration and example for purposes of clarity and understanding, it will be obvious that various modifications and changes which are within the knowledge of those skilled in the art are considered to fall within the scope of the invention.

The invention claimed is:

1. A speech recognition system comprising:
   at least one processor
   at least one memory coupled to said processor and having instructions stored thereon that upon execution by the processor:
   determine a pitch harmonic using a peak-picking formula applied to a short-term power spectrum;
   apply class-dependent harmonic weighting to a harmonic spectrum to determine the harmonics weighted spectrum;
   apply a filter to the harmonic weighted spectrum; and
   determine an energy output from the harmonic weighted spectrum and transform into cepstrum by applying a discrete cosine transform.

2. The system of claim 1, wherein the at least one memory has instructions stored thereon that when executed by the processor:
   obtain the short-term power spectrum from a signal representative of speech;
   estimate a robust pitch on said signal representative of speech;
   process said signal representative of speech by a Fast Fourier transform or a
   Discrete Fourier transform for use in obtaining at least one of power spectrum, pitch harmonic spectrum.

3. The system of claim 1, wherein the at least one memory has instructions stored thereon that when executed by the processor estimate a robust pitch on said signal representative of speech classifies portions of the signal representative of speech as voiced, unvoiced, or transitional and uses a spectro-temporal auto-correlation.

4. The system of claim 3 wherein the at least one memory has instructions stored thereon that when executed by the processor estimate a robust pitch on said signal representative of speech applies a program that substantially embodies the formula:

$$R(\tau) = \beta \cdot R^T(\tau) + (1-\beta) \cdot R^S(\tau)$$

wherein $\beta = 0.5$
wherein $$R^T(\tau) = \frac{\sum_{n=0}^{N-\tau-1} [\tilde{s}_t(n) \cdot \tilde{s}_t(n+\tau)]}{\sqrt{\sum_{n=0}^{N-\tau-1} \tilde{s}_t^2(n) \cdot \sum_{n=0}^{N-\tau-1} \tilde{s}_t^2(n+\tau)}}$$

and N is the number of samples for pitch estimation, wherein $$R^S(\tau) = \frac{\int_0^{\pi-\omega_\tau} \tilde{S}_f(\omega) \tilde{S}_f(\omega + \omega_\tau)}{\sqrt{\int_0^{\pi-\omega_\tau} \tilde{S}_f^2(\omega) \int_0^{\pi-\omega_\tau} \tilde{S}_f^2(\omega + \omega_\tau)}}$$

and $\omega_\tau = 2\pi/\tau$, $S_f(\omega)$ is the magnitude spectrum of $s_t(n)$, and $\tilde{S}_f(\omega)$ is the zero-mean version of $S_f(\omega)$.

5. The system of claim 1 wherein the at least one memory has instructions stored thereon that when executed by the processor to determine the harmonics weighted spectrum substantially in accordance with a program that embodies the formula:

$$HWS(\omega) = w_h(w) \cdot S_f(\omega)$$

wherein $w_h(\omega) = W_H$ or 1 and $S_f(\omega) =$ the magnitude spectrum of input speech.

6. The system of claim 5, wherein $W_H = 100$ for voiced sounds.

7. The system of claim 5, $W_H = 10$ for transitional sounds.

8. The system of claim 1, the at least one memory has instructions stored thereon that when executed by the processor apply a mel-scaled filter to the harmonic weighted spectrum uses a formula substantially in accordance with:

$$\hat{S}(\omega)=[S(\omega)]^{1/3}$$

$$\hat{E}_i=\log(E_i), 1\leq i\leq M$$

wherein $\hat{S}(\omega)$ is the compressed spectrum and $\hat{E}_1$ is the log energy for band-pass filter i.

9. The system of claim 1, wherein the at least one memory has instructions stored thereon that when executed by the processor apply an intensity-loudness power law to the power spectrum to obtain a root-power compressed spectrum prior to estimating robust pitch.

10. A speech recognition system comprising:
at least one processor to execute one or more sets of computer executable instructions
a memory in communication with said processor and having stored thereon the one or more sets of computer executable instructions, comprising:
instructions to compress the spectral components by taking a root value;
instructions to detect at least one of voice, unvoice and transition and estimating pitch;
instructions to detect pitch harmonics by detecting peaks in the frequency domain;
instructions to determining harmonic confidence, voicing strength and cut-off frequency;
instructions to estimate a harmonic weighted spectrum from detected peaks in the frequency domain; the harmonic confidence, the voicing strength and the cut-off frequency; and
instructions to apply a filter the estimated harmonic weighted spectrum; and
instructions to provide a representation of the output from the applied filter to a speech recognition algorithm.

11. The system as recited in claim 10, wherein the memory comprises
instructions stored thereon to accept a speech wave form; and
instructions to perform a fourier transform to convert the speech waveform to spectral components in a frequency domain wherein the fourier transform comprises one of a Fast Fourier transform or a Discrete Fourier transform.

12. The system of claim 10 wherein the memory comprises instructions for detecting at least one of voice, unvoice and transition and estimating pitch uses executable instructions that embody a spectro-temporal auto-correlation.

13. The system of claim 10 wherein the memory comprises instructions for providing a representation of the output from the applied filter to a speech recognition algorithm.

14. A computer-based method for generating a set of characteristic speech coefficients, comprising:
programming a digital computer with computer executable instructions, that when executed cause said computer to perform the following functions for each short term power spectrum of a target speech waveform:
compressing spectral components by taking a predetermined root value;
detecting voiced speech, unvoiced speech, or transitional speech, and if so detected, estimating an associated pitch;
detecting pitch harmonics by detecting peaks in the corresponding frequency domain;
determining harmonic confidence, voicing strength and cut-off frequency;
estimating a corresponding band harmonic weighted spectrum from the detected peaks in the frequency domain; the harmonic confidence, the voicing strength and the cut-off frequency; and
applying a filter to the estimated band harmonic weighted spectrum;
deriving a sequence of short term power spectra from a target speech waveform; and
using the programmed digital computer to convert the spectral components of each power spectrum in the sequence into a respective filtered band harmonic weight spectrum.

15. The method as recited in claim 14, wherein the function of detecting peaks in the corresponding frequency domain involves performing a fourier transform to convert the speech waveform to spectral components in a frequency domain, and the fourier transform comprises one of a Fast Fourier transform or a Discrete Fourier transform.

16. The method of claim 14 wherein the function of estimating pitch in the detected speech involves a spectro-temporal auto-correlation.

17. The method of claim 14 further comprising,
providing a representation of the filtered band harmonic weight spectra to a speech recognition algorithm.

* * * * *